(12) United States Patent
Rozman et al.

(10) Patent No.: US 7,439,715 B2
(45) Date of Patent: Oct. 21, 2008

(54) DUAL SOURCE POWER GENERATING SYSTEM

(75) Inventors: Gregory I. Rozman, Rockford, IL (US); Mahesh J. Shah, Lindenhurst, IL (US); Alan E. King, Delaware, OH (US)

(73) Assignee: Hamilton Sundstrand Corporation, Rockford, IL (US)

( * ) Notice: Subject to any disclaimer, the term of this patent is extended or adjusted under 35 U.S.C. 154(b) by 380 days.

(21) Appl. No.: 11/439,480

(22) Filed: May 22, 2006

(65) Prior Publication Data

US 2007/0268004 A1 Nov. 22, 2007

(51) Int. Cl.
*H02P 9/00* (2006.01)

(52) U.S. Cl. .............................. 322/45; 322/56; 322/89; 322/57

(58) Field of Classification Search .................... 322/45, 322/56, 89, 57
See application file for complete search history.

(56) References Cited

U.S. PATENT DOCUMENTS

| | | | |
|---|---|---|---|
| 3,793,544 A | 2/1974 | Baumgartner et al. | |
| 4,117,390 A | 9/1978 | Iwata et al. | |
| 5,169,287 A | 12/1992 | Proctor et al. | |
| 5,247,808 A | 9/1993 | Yoshida et al. | |
| 5,448,154 A | 9/1995 | Kanke et al. | |
| 5,510,696 A | 4/1996 | Naidu et al. | |
| 5,977,648 A | 11/1999 | Seffernick et al. | |
| 6,020,713 A | 2/2000 | Geis et al. | |
| 6,218,820 B1 | 4/2001 | D'Arrigo et al. | |
| 6,355,987 B1 | 3/2002 | Bixel | |
| 6,373,230 B2 | 4/2002 | Jabaji | |
| 6,455,951 B1 | 9/2002 | Shultz et al. | |
| 6,853,173 B2 | 2/2005 | Caine et al. | |
| 6,914,385 B2 | 7/2005 | Tamai et al. | |
| 7,256,567 B2 * | 8/2007 | Kawamura | 322/46 |
| 7,288,923 B1 * | 10/2007 | Dooley et al. | 322/89 |
| 2004/0178773 A1 | 9/2004 | Eguchi et al. | |
| 2004/0231831 A1 | 11/2004 | Houck et al. | |

* cited by examiner

*Primary Examiner*—Darren Schuberg
*Assistant Examiner*—Iraj A. Mohandesi
(74) *Attorney, Agent, or Firm*—Kinney & Lange, P.A.

(57) ABSTRACT

A power generating system provides high voltage AC power and low voltage DC power using a single generator. The generator includes a rotor and a stator that is wound with a first winding and a second winding. The first winding has a greater number of turns than the second winding and generates high voltage AC power in response to the rotating magnetic field created by the rotor. The second winding generates low voltage AC power in response to the rotating magnetic field created by the rotor. The low voltage AC power is converted to low voltage DC power by a rectifier. The low voltage DC power is further controlled by a DC-DC converter to generate controlled DC power. A controller monitors the DC power generated by the DC-DC converter, and generates pulse width modulation signals that are provided to the DC-DC converter, selectively increasing or decreasing the controlled DC power provided by the DC-DC converter.

12 Claims, 2 Drawing Sheets

DUAL SOURCE POWER GENERATING SYSTEM

BACKGROUND OF THE INVENTION

The present invention relates to power generation systems, and more particularly to a power generation system for meeting a variety of voltage requirements.

Generators are used to convert mechanical energy into electrical energy. Depending on the application, a specific type of generator may be employed to generate a desired output signal. For example, a generator found on an automobile (commonly referred to as an alternator) converts mechanical energy provided by the vehicles combustion engine to provide electrical power to on-board electronics, as well as to charge the vehicle's battery. Typically, on-board electronics and the vehicle's battery are designed to require the same voltage (e.g., 12 volts (V)), which allows a single generator to provide the necessary electrical power.

However, in some applications the voltage requirement of one load may differ from the voltage requirement of another load. For example, a vehicle designed to provide refrigerated transportation requires high voltage alternating current (AC) power (e.g., 120 VAC) to operate the refrigeration system, and relatively low voltage (e.g., 12 VDC) to power on-board electronics and to charge the battery. In this situation, it would be desirable if a single generator were able to source both the high voltage AC load and the low voltage DC load. Furthermore, it would be desirable if the generator could accurately maintain the DC voltage provided to the DC load at a desired level, providing a high-quality DC voltage.

BRIEF SUMMARY OF THE INVENTION

The present invention provides a dual source power generating system that includes a rotating magnetic field and a stator structure having a first winding and a second winding. The rotating magnetic field generates a high-voltage AC power in the first winding, and a low-voltage AC power in the second winding. A rectifier and DC-DC converter coupled to the second winding operates to convert the low-voltage AC power to a low-voltage DC power. A controller connected to monitor the voltage and current of the low-voltage DC power provided to a DC load calculates pulse width modulation (PWM) signals and provides the PWM signals to the DC-DC converter to maintain the low-voltage DC power at a desired level.

DETAILED DESCRIPTION

The power generating system of the present invention provides multiple output voltages using a single generator, including a high quality DC output. The generator includes a stator that is wound with a first winding and a second winding, wherein the first winding interacts with the magnetic flux generated by a rotor to generate a first AC output voltage and the second winding interacts with the magnetic flux generated by the rotor to generate a second AC output voltage. The magnitude of the AC output voltage generated by the first and second windings is dependent in part on the number of turns included in each winding. The power generating system includes a rectifier, a DC-DC converter and controller to convert the second AC output voltage to a desired DC output voltage. The present invention therefore provides a single generator that is capable of providing at least two types of output voltages that differ in magnitude, wherein at least one of the output voltages is a high quality DC voltage. One application of this system is for a vehicle having a refrigeration system that requires high voltage AC power (i.e., roughly 120 V AC, 60 Hz power). The generator of the present invention could be used in a number of similar applications that otherwise would require the use of at least two separate generators.

Figure 1:
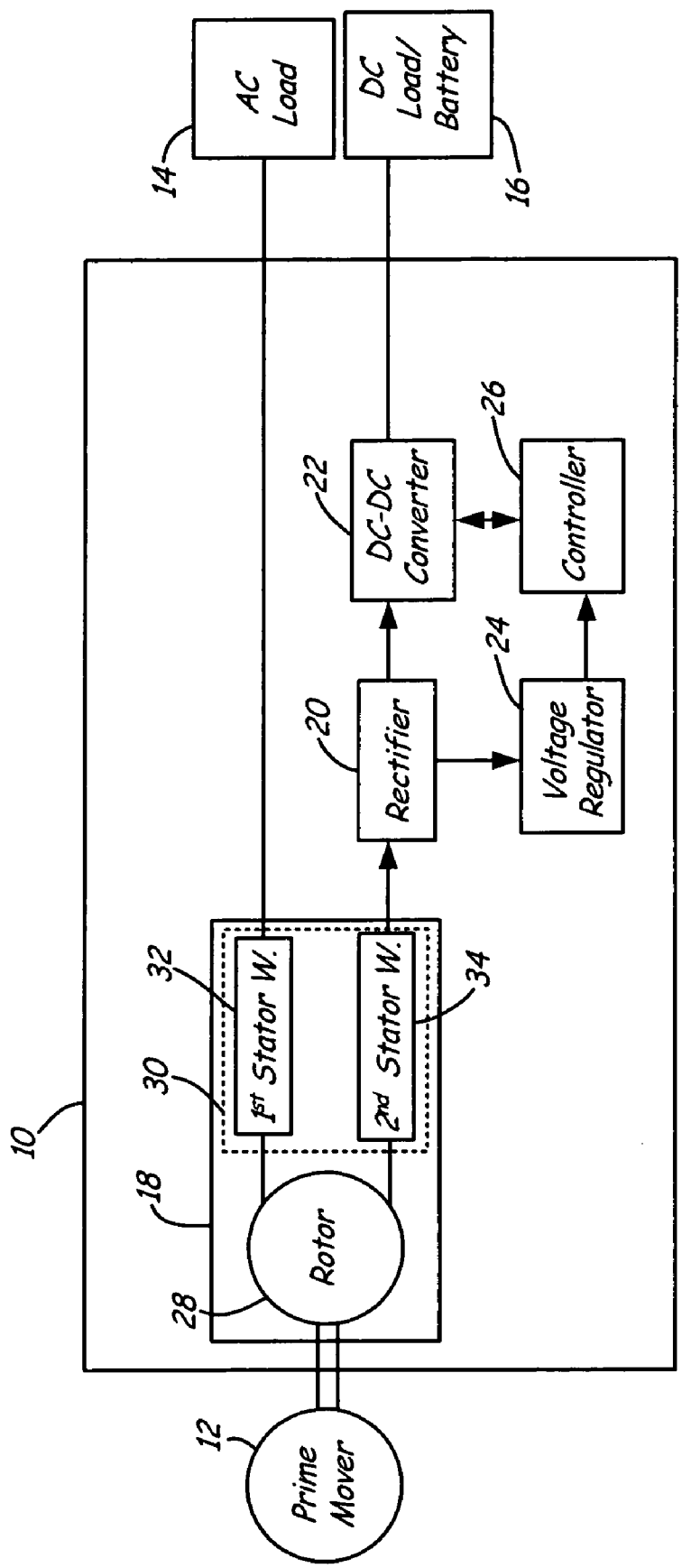
FIG. 1 is a functional block diagram of a dual source power generating system connected to receive mechanical energy from a prime mover and to provide dual source power.
Figure 2:
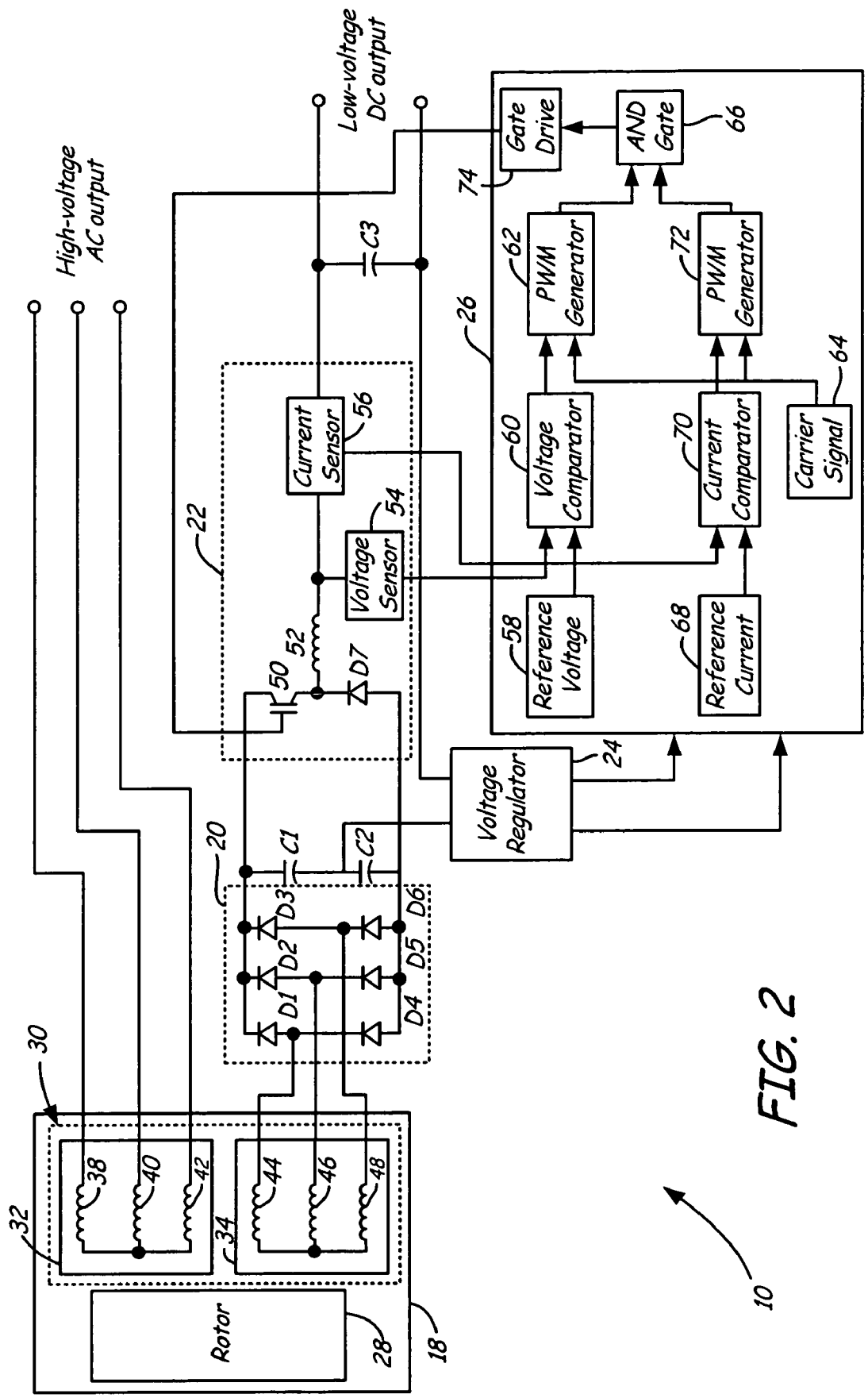
FIG. 2 is a hybrid circuit/functional diagram of the dual source power generating system shown in FIG. 1.

FIG. 1 is a functional block diagram of power-generating system 10 connected to receive mechanical power from prime mover 12 and to deliver AC power to AC load 14 and high quality DC power to DC load/battery 16. Power generating system 10 includes AC generator 18, rectifier 20, DC-DC converter 22, voltage regulator 24 and controller 26. AC generator 18 includes rotor 28 and stator 30, wherein first stator windings 32 and second stator windings 34 wound around stator 30. As shown in FIG. 2, first stator windings 32 and second stator windings 34 may each include three individual windings for generating three-phase AC power.

In one embodiment, generator 18 is a wound field synchronous machine, wherein field windings (shown in FIG. 2) wrapped around rotor 28 are excited such that a magnetic field is generated by rotor 28. In another embodiment, generator 18 is a permanent magnet machine in which no external excitation is required to generate the magnetic field. Mechanical energy received from prime mover 12 causes rotor 28 to turn, resulting in a rotating magnetic field being presented to stator 30. The rotating magnetic field generates a corresponding AC voltage in first stator winding 32 and second stator winding 34. The magnitudes of the AC output voltages generated by first stator windings 32 and second stator windings 34, respectively, are based on the strength of the magnetic field generated by rotor 28, the speed of rotor 28, and the number of turns making up first stator windings 32 and second stator windings 34. By increasing the number of turns, the output voltage generated by a particular winding is increased. In this embodiment, because high voltage AC power is required by AC load 14, first stator winding 32 includes a large number of turns resulting in a relatively large AC voltage (e.g., 115 volts) being provided to AC load 14. In contrast, DC load/battery 16 requires relatively low voltage DC power (e.g., 12 volts). Therefore, second stator windings 34 have a relatively low number of turns, resulting in relatively low voltage AC power (e.g., 20 volts) being provided by generator 18.

In order to provide high quality (i.e., steady magnitude, low ripple) DC power to DC load 16, the low voltage power generated by second stator windings 34 is first converted to low voltage DC power by rectifier 20. The rectified DC voltage is provided to both voltage regulator 24 and DC-DC converter 22. Voltage regulator 24 acts as a power supply, providing controller 26 with the necessary DC power to operate. Controller 26 monitors the DC output provided by DC-DC converter 22 to DC load 16 and provides input to DC-DC converter 22 based on the monitored DC output such that a desired DC output is provided to DC load 16. That is, DC-DC converter 22 provides a controlled DC output to DC load 16 based on input received from controller 26.

In this way, generator 18 provides high voltage AC power to AC load 14 and a high quality-low voltage power to DC load 16 without the need for a second generator. Furthermore, DC-DC converter provides DC power that is controlled to a desired magnitude, resulting in high quality DC voltage being provided to DC load 16.

FIG. 2 is a circuit diagram illustrating circuit components employed by power generation system 10. Generator 18 includes rotor 28 and stator 30, wherein stator 30 includes first stator windings 32 and second stator windings 34. As shown in FIG. 2, first stator windings 32 includes three individual windings 38, 40 and 42 for generating three phase AC power denoted Va, Vb, and Vc, respectively. Likewise, second stator windings 34 include three individual windings 44, 46 and 48 for generating three phase AC denoted Vx, Vy and Vz. The number of turns included in individual windings 38, 40 and 42 is selected to generate approximately 120 volts AC line-to-neutral three-phase power at 60 Hz at outputs Va, Vb, and Vc. The number of turns included in windings 44, 46 and 48 is selected to generate approximately 20 volts AC line-to-neutral three-phase power at 60 Hz at outputs Vx, Vy, and Vz. Therefore, the number of turns included in windings 38, 40 and 42 is greater than the number of turns included in windings 44, 46 and 48. In other embodiments, the AC output voltages generated by the first and second set of windings can be varied to meet the requirements of the application by varying the number of turns included in the respective windings.

The AC output voltage generated by first set of windings 32 provides high voltage AC power to a respective load (not shown) via output voltages Va, Vb, and Vc. The AC output voltage generated by second stator windings 34 provides low voltage AC power to rectifier 20, which includes diodes D1, D2, D3, D4, D5, and D6 connected in a bridge configuration that converts the low voltage AC power to a low voltage DC power. Capacitors C1 and C2 are connected in series across rectifier 20 and together act to reduce ripple in the low voltage DC power provided to DC-DC converter 22. Voltage regulator 24 is connected between capacitors C1 and C2, and provides the DC voltage necessary to operate controller 26.

DC-DC converter 22 converts the low voltage DC power provided by rectifier 20 to a controlled, high quality, low voltage DC power that is provided to DC output/battery 16. DC-DC converter 22 includes transistor 50, inductor 52, diode D7, voltage sensor 54, and current sensor 56. In this embodiment, DC-DC converter 22 is connected in a buck or step-down configuration to convert low voltage DC power received from rectifier 20 to a reduced voltage DC output that is provided to DC load/battery 16. In other applications, DC-DC converter 22 may be connected to step-up voltage provided by rectifier 20. Control of the low voltage DC power provided by DC-DC converter 22 is done by selectively turning transistor 50 ON and OFF such that low voltage DC power provided by rectifier 20 is selectively applied to inductor 52. In order to maintain the desired DC output voltage, voltage sensor 54 and current sensor 56 provide feedback to controller 26 with respect to present output voltage and output current being provided to DC load 16. Based on the measurements received from voltage sensor 54 and current sensor 56, controller 26 controls the state of transistor 50 to maintain the desired DC output voltage.

The operation of controller 26 is illustrated by functional block elements that may be implemented in either software or hardware, or a combination of software and hardware. Controller 26 includes voltage reference 58, voltage comparator 60, carrier signal 64, first PWM generator 62, AND gate 66, current reference 68, current comparator 70, second PWM generator 72, and gate drive 74. Voltage reference 58 represents the desired DC output voltage to be provided by DC-DC converter 22, and current reference 68 represents the desired DC output current to be provided by DC-DC converter 22. These values are used by controller 26, along with sensed DC output voltage and current values, to determine the pulse width modulated (PWM) signal to apply to the gate of transistor 50 to maintain a desired DC output.

Calculation of the PWM signal to be applied to the gate of transistor 50 includes calculating separately the PWM signals related to maintaining a desired voltage level and the PWM signals related to maintaining a desired current level. The voltage related PWM signals and current related PWM signals are combined to generate the actual PWM signal provided to the gate of transistor 50. The combination of voltage and current calculations performed by controller 26 not only maintains the desired DC output voltage, but also protects DC load 16 from overcurrent conditions.

As shown within controller 26, reference voltage 58 is compared with voltage sensed by voltage sensor 54 at voltage comparator block 60. Voltage comparator block 60 compares the desired DC output voltage represented by reference voltage 58 with the actual DC output voltage sensed by voltage sensor 54. In one embodiment, voltage comparator block 60 calculates the difference between the sensed DC output and reference voltage 58. In another embodiment, voltage comparator block 60 employs proportional, integral (PI) control to calculate error between the sensed DC output and the reference voltage 58. The calculated difference or error between the sensed DC output voltage and the reference voltage 58 along with a carrier waveform 64 are provided to PWM generator 64. Carrier waveform 64 is a saw-tooth shaped triangular waveform. The PWM waveform is generated by comparing the error generated by voltage comparator block 60 with carrier waveform 64. The resulting PWM signal is designed to cause the DC output voltage to increase or decrease (as required) toward the desired output voltage.

A similar process is carried out with respect to the current sensed by current sensor 56. Current reference value 68 is compared with the measured DC current (as sensed by current sensor 56) by current comparator block 70. A resulting error value, calculated either as a difference between the two values or using PI control, is provided to PWM generator 72, which calculates a PWM waveform related to DC output current using carrier signal 64. The PWM waveform generated by PWM generator 62 (and relating to sensed DC output voltage) and the PWM waveform generated by PWM generator 72 (and relating to sensed DC output current) are provided to AND gate 66, which performs a logical AND operation on the respective PWM waveforms. The resulting combination of the PWM waveform generated by PWM generator 62 and the PWM waveform generated by PWM generator 72 is the PWM signal that is provided to DC-DC converter 22 by gate drive 74.

The benefit of combining PWM waveforms generated with respect to both measured voltage and current values of the DC output voltage, is the ability of DC-DC converter to provide a DC output having a desired voltage magnitude, while protecting DC-DC converter (as well as DC load 16) from overcurrent or short circuit conditions. That is, if the DC output voltage provided to DC load 16 drops below the desired DC voltage level, the resulting PWM waveform generated by controller 26 will increase the ON time of transistor 50, increasing the DC output voltage. Likewise, if the current being drawn by DC load 16 exceeds the desired DC output current (such as in a overcurrent or short circuit situation), the resulting PWM waveform related to DC output current will reduce the ON time of transistor 50, and therefore reduce the amount of current provided to DC load 16.

Although the present invention has been described with reference to preferred embodiments, workers-skilled in the art will recognize that changes may be made in form and detail without departing from the spirit and scope of the invention. In particular, the present invention has been described with respect to a wound field synchronous generator and a permanent magnet generator, although other types of generators could also be employed. Furthermore, in the manner in which dual source generating system of the present invention has been described for providing a high voltage AC output and a low voltage DC output, other combinations of voltage outputs (both AC and DC) are possible, as outputs exceeding two output voltages.

The invention claimed is:

1. A power generating system comprising:
    an alternating current (AC) generator having a rotor for generating a rotating magnetic field;
    a stator;
    a first winding and a second winding wound around the stator, wherein in response to the rotating magnetic field the first winding generates high-voltage AC power and the second winding generates low-voltage AC power;
    a rectifier coupled to the second winding for converting the low-voltage AC power to low voltage direct current (DC) power;
    a DC-DC converter coupled to the rectifier for converting the low-voltage DC power to a DC output, the DC-DC converter including a voltage sense circuit and a current sense circuit for measuring the voltage and current associated with the DC output; and
    a controller connected to provide a pulse width modulation (PWM) signal to the DC-DC converter based on the measured voltage and current of the DC output.

2. The power generating system of claim 1, wherein the first winding has a greater number of turns than the second winding.

3. The power generating system of claim 1, wherein the high-voltage AC power generated by the first winding is three phase AC power.

4. The power generating system of claim 1, wherein the low-voltage AC power generated by the second winding is three phase AC power.

5. The power generating system of claim 1, wherein the DC-DC converter includes:
    a switching circuit selectively turned ON and OFF by the PWM signals received from the controller; and
    an inductor coupled to the switching circuit that provides the DC output to voltage sense circuit and the current sense circuit, wherein the low-voltage DC power provided by the rectifier is provided to the inductor when the switching circuit is turned ON by the PWM signals and the low-voltage DC power is prevented from reaching the inductor when the switching circuit is turned OFF.

6. The power generating system of claim 5, wherein the controller includes:
    a voltage comparator for comparing the DC output voltage measured by the voltage sense circuit with a desired DC output voltage; and
    a current comparator for comparing the DC output current measured by the current sense circuit with a desired DC output current, wherein the PWM signals provided to the switching circuit are derived based on comparisons made by the voltage comparator and the current comparator.

7. The power generating system of claim 6, further including:
    a first PWM generator for generating first PWM signals based on input received from the voltage comparator;
    a second PWM generator for generating second PWM signals based on input received from the current comparator; and
    a logic gate for combining the first and second PWM signals to generate the PWM signals to provide to the switching circuit.

8. A dual source power generating system comprising:
    a stator having a first set of windings for generating high-voltage alternating current (AC) power and a second set of windings for generating low-voltage AC power;
    means for converting the low-voltage AC power to a controlled low-voltage DC power;
    a voltage sense circuit connected to measure voltage magnitude of the controlled low-voltage DC power;
    a current sense circuit connected to measure current magnitude of the controlled low-voltage DC power; and
    means for calculating pulse width modulation (PWM) signals based on the measured voltage magnitude and current magnitude of the controlled low-voltage DC power to maintain the controlled low-voltage DC power at a desired level; and
    means for providing the PWM signals to the means for converting the low-voltage AC power to a controlled low-voltage DC power.

9. The dual source power generating system of claim 8, wherein the first set of windings has a number of turns greater than the second set of windings.

10. The dual source power generating system of claim 8, wherein the means for converting the low-voltage AC power to a controlled low-voltage DC power DC-DC converter includes:
    a rectifier coupled to convert the low-voltage AC power to a low-voltage DC power; and
    a DC-DC converter coupled to convert the low-voltage DC power to the controlled low-voltage DC power based on the provided PWM signals.

11. The dual source power generation system of claim 8, wherein the means for calculating the PWM signals includes:
    means for comparing the measured voltage magnitude to a reference voltage value to generate a difference signal related to voltage;
    means for comparing the measured current magnitude to a reference current value to generate a difference signal related to current; and
    means for generating the PWM signals based on the difference signal related to voltage and the difference signal related to current.

12. The dual source power generation system of claim 11, wherein the means for generating the PWM signal based on the difference signal related to voltage and the difference signal related to current includes:
    a first comparator that generates a first PWM signal based on the difference signal related to voltage and a carrier signal;
    a second comparator that generates a second PWM signal based on the difference signal related to current and the carrier signal; and
    a logic gate connected to combine the first PWM signal and the second PWM signal to generate the PWM signal provided to the means for converting the low-voltage AC power to a controlled low-voltage DC power.

* * * * *